(12) United States Patent
Tsuda et al.

(10) Patent No.: US 11,448,510 B2
(45) Date of Patent: Sep. 20, 2022

(54) VEHICLE INFORMATION PROCESSING SYSTEM

(71) Applicant: ISUZU MOTORS LIMITED, Tokyo (JP)

(72) Inventors: Ryuuta Tsuda, Yokohama (JP); Masaichi Takahashi, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 408 days.

(21) Appl. No.: 16/614,756

(22) PCT Filed: May 15, 2018

(86) PCT No.: PCT/JP2018/018742
§ 371 (c)(1),
(2) Date: Nov. 18, 2019

(87) PCT Pub. No.: WO2018/212172
PCT Pub. Date: Nov. 22, 2018

(65) Prior Publication Data
US 2020/0173785 A1 Jun. 4, 2020

(30) Foreign Application Priority Data
May 18, 2017 (JP) .............................. JP2017-098583

(51) Int. Cl.
*G01C 21/26* (2006.01)
*G06N 20/00* (2019.01)
(Continued)

(52) U.S. Cl.
CPC ........... *G01C 21/26* (2013.01); *G05D 1/0088* (2013.01); *G05D 1/0221* (2013.01); *G06N 7/005* (2013.01);
(Continued)

(58) Field of Classification Search
CPC ...... G06N 7/005; G06N 20/00; G05D 1/0088; G05D 1/0221; G05D 2201/0213;
(Continued)

(56) References Cited

U.S. PATENT DOCUMENTS 5,010,512 A * 4/1991 Hartstein ............... G06N 3/063
257/E29.264
5,974,359 A * 10/1999 Ohkubo ................. G01C 21/28
701/469
(Continued)

FOREIGN PATENT DOCUMENTS

JP 2008-058185 A 3/2008
JP 2009-41932 A 2/2009
(Continued)

OTHER PUBLICATIONS

Jing Li, Ningfang Song, Gongliu Yang, Ming Li, Qingzhong Cai, Improving positioning accuracy of vehicular navigation system during GPS outages utilizing ensemble learning algorithm, Information Fusion, vol. 35, (Year: 2017).*
(Continued)

*Primary Examiner* — Angelina Shudy
(74) *Attorney, Agent, or Firm* — Procopio, Cory, Hargreaves & Savitch LLP

(57) ABSTRACT

A position acquisition device includes a learning execution unit that learns a change value of an on-board sensor, a changing unit that changes an output value of the on-board sensor based on the change value, a position calculation unit that calculates a traveling position of the vehicle based on the output value of the on-board sensor changed by the changing unit, and an output unit that outputs a progress status of the learning by the learning execution unit and the traveling position of the vehicle calculated by the position calculation unit. An application execution device determines whether the output of the position acquisition device is able
(Continued)

to be used for executing the application based on the progress status and the traveling position acquired from the position acquisition device.

3 Claims, 3 Drawing Sheets

(51) Int. Cl.
*G05D 1/00* (2006.01)
*G05D 1/02* (2020.01)
*G06N 7/00* (2006.01)

(52) U.S. Cl.
CPC ..... *G06N 20/00* (2019.01); *G05D 2201/0213* (2013.01)

(58) Field of Classification Search
CPC ..... B60W 60/00; G01C 21/26; G01C 21/265; G01C 21/34; G01C 21/36
See application file for complete search history.

(56) References Cited

U.S. PATENT DOCUMENTS

| | | | | |
|---|---|---|---|---|
| 10,730,531 | B1* | 8/2020 | Phillips | G05D 1/0088 |
| 2005/0120054 | A1* | 6/2005 | Shulman | H04L 63/14 |
| 2014/0089238 | A1* | 3/2014 | Saito | G06N 20/00 715/753 |
| 2014/0371907 | A1* | 12/2014 | Passot | G06N 3/08 700/257 |
| 2015/0127149 | A1* | 5/2015 | Sinyavskiy | G05D 1/0088 700/250 |
| 2015/0324686 | A1* | 11/2015 | Julian | G06N 3/08 706/25 |
| 2016/0307289 | A1* | 10/2016 | Choksi | G06Q 50/30 |
| 2017/0004399 | A1* | 1/2017 | Kasahara | G06N 3/0454 |
| 2017/0139816 | A1* | 5/2017 | Sapozhnikov | G06F 11/3672 |
| 2017/0160088 | A1* | 6/2017 | Azami | G01C 21/12 |
| 2017/0242434 | A1* | 8/2017 | Ewert | G09B 19/167 |
| 2018/0053093 | A1* | 2/2018 | Olabiyi | B60W 40/09 |
| 2018/0120115 | A1* | 5/2018 | Shikimachi | G01C 21/30 |
| 2018/0157934 | A1* | 6/2018 | Hu | G06K 9/6262 |
| 2018/0196439 | A1* | 7/2018 | Levinson | G05D 1/0088 |
| 2019/0043348 | A1* | 2/2019 | Eno | G06N 7/005 |
| 2019/0080228 | A1* | 3/2019 | Seth | G06N 3/0472 |
| 2019/0135279 | A1* | 5/2019 | Irie | B60W 60/0057 |
| 2019/0146514 | A1* | 5/2019 | Son | G07C 5/02 701/27 |
| 2019/0156249 | A1* | 5/2019 | Nakata | G06N 3/063 |
| 2019/0268807 | A1* | 8/2019 | Babu | H04L 1/0002 |
| 2019/0370687 | A1* | 12/2019 | Pezzillo | H04L 67/10 |
| 2019/0394448 | A1* | 12/2019 | Ziegler | G06T 7/60 |
| 2020/0142409 | A1* | 5/2020 | Valois | G05D 1/027 |
| 2020/0269867 | A1* | 8/2020 | Hua | B60T 7/22 |
| 2020/0387787 | A1* | 12/2020 | Yoda | G06F 7/49942 |
| 2021/0078611 | A1* | 3/2021 | Hayes | B60W 50/0097 |
| 2021/0082301 | A1* | 3/2021 | He | G06N 3/0454 |
| 2021/0133582 | A1* | 5/2021 | Refaat | G06N 3/084 |
| 2021/0174209 | A1* | 6/2021 | Zhuang | G06N 3/084 |
| 2021/0223780 | A1* | 7/2021 | Bramley | G06V 20/56 |
| 2022/0011776 | A1* | 1/2022 | Narang | G06V 20/56 |
| 2022/0058525 | A1* | 2/2022 | Yonetani | G06N 20/00 |
| 2022/0116764 | A1* | 4/2022 | Pezeshki | H04L 41/16 |

FOREIGN PATENT DOCUMENTS

| | | |
|---|---|---|
| JP | 2011-220688 A | 11/2011 |
| JP | 2016-156802 A | 9/2016 |

OTHER PUBLICATIONS

International Search Report and Written Opinion for related International Application No. PCT/JP2018/018742, dated Aug. 7, 2018; English translation of ISR provided (6 pages).

* cited by examiner

VEHICLE INFORMATION PROCESSING SYSTEM

TECHNICAL FIELD

This disclosure relates to an information processing system, and more particularly to a vehicle information processing system used by being mounted on a vehicle.

BACKGROUND ART

In recent years, there has been known a satellite navigation for acquiring position information of a vehicle based on a signal from a navigation satellite, an autonomous navigation for acquiring position information of a vehicle acquired based on output values of various sensors mounted on the vehicle, and a hybrid navigation using both of them. Patent Literature 1 discloses a technique in which both the navigation satellite and the autonomous navigation are used in combination.

CITATION LIST

Patent Literature

Patent Literature 1: JP-A-2009-41932

SUMMARY OF INVENTION

Technical Problem

In the hybrid navigation, for example, in a case where a radio wave intensity received from the navigation satellite is weak when the vehicle is traveling in a tunnel, a position of the vehicle is acquired by the autonomous navigation. A device for realizing the autonomous navigation realizes the autonomous navigation by specifying a position coordinate of the vehicle based on an output value of an angle sensor, an acceleration sensor, or the like. The position coordinate of the vehicle specified by the device are used in various applications such as an application program (hereinafter, simply referred to as an "application") for auto-cruising the vehicle and a log application for recording a vehicle state. The former application is an application related to fuel consumption, safety, and regulation of the vehicle, and the latter application can be said to be an application for leaving information.

These sensors may vary in the output values depending on how they are attached to the vehicle or individual differences. Therefore, for example, position information or the like obtained from a global positioning system (GPS) sensor is used as teacher data to learn a change value for changing the output value of the sensor.

The device responsible for the autonomous navigation changes the output value of the sensor with reference to the change value that is a learning result stored in a nonvolatile storage unit or a volatile temporary storage unit. Here, in an initial learning stage before the change value is learned, the learning result naturally does not exist. In addition, during the learning, there is only an incomplete learning result. Further, in a case where the learning result is stored in the volatile temporary storage unit, the stored content in the temporary storage unit may be reset due to, for example, an instantaneous interruption of a power source of the vehicle, generation of a negative surge, or the like. In addition, for example, in a case where a size of a tire to be provided in the vehicle is changed, or the like, it is necessary to relearn the change value of the sensor.

In this case, since the device that acquires the position coordinates using the autonomous navigation cannot change the output value of the sensor, it cannot always be guaranteed that highly accurate position coordinate will be output until the learning of the change value of the output value is completed.

On the other hand, even when the output value of the sensor is not changed, the output value of the sensor is considered to have a certain accuracy. Therefore, depending on an application in which the accuracy of the position coordinate is not required, there may be a case where the output value of the sensor is able to be used even before the learning of the change value is completed.

This disclosure provides a technique for effectively using an output value during learning in an application that learns and corrects a change amount of the output value with using an on-board sensor.

Solution to Problem

An aspect of this disclosure is a vehicle information processing system. The system includes a position acquisition device that learns a change value of a sensor for acquiring a traveling position of the vehicle, the sensor being an on-board sensor mounted on a vehicle, and an application execution device that executes an application related to traveling of the vehicle by using an output value of the position acquisition device. The position acquisition device includes a learning execution unit that learns a change value of an output value of the on-board sensor, a changing unit that changes the output value of the on-board sensor based on the change value, a position calculation unit that calculates the traveling position of the vehicle based on the output value of the on-board sensor changed by the changing unit, and an output unit that outputs a progress status of the learning by the learning execution unit and the traveling position of the vehicle calculated by the position calculation unit. The application execution device determines whether output of the position acquisition device is able to be used for executing the application based on the progress status and the traveling position acquired from the position acquisition device.

The application execution device executes an application for controlling the traveling of the vehicle, and may wait to execute the application that uses the output of the position acquisition device until a progress rate of the learning included in the progress status acquired from the position acquisition device reaches a predetermined ratio, in a case where the vehicle is not traveling on a motor way.

The application execution device executes the application for controlling the traveling of the vehicle, and may wait to execute the application that uses the output of the position acquisition device until the progress rate of the learning included in the progress status acquired from the position acquisition device reaches the predetermined ratio.

The application execution device executes an application that is not directly related to a travel control of the vehicle, and may execute the application that uses the output of the position acquisition device regardless of the progress rate of the learning included in the progress status acquired from the position acquisition device.

Advantageous Effects of Invention

According to this disclosure, it is possible to provide a technique for effectively using the output value during the learning in the application that uses the on-board sensor whose a change amount of the output value is learned and changed.

DESCRIPTION OF EMBODIMENTS

Overview of Embodiment

An overview of an embodiment will be described with reference to FIG. 1.

Figure 1:
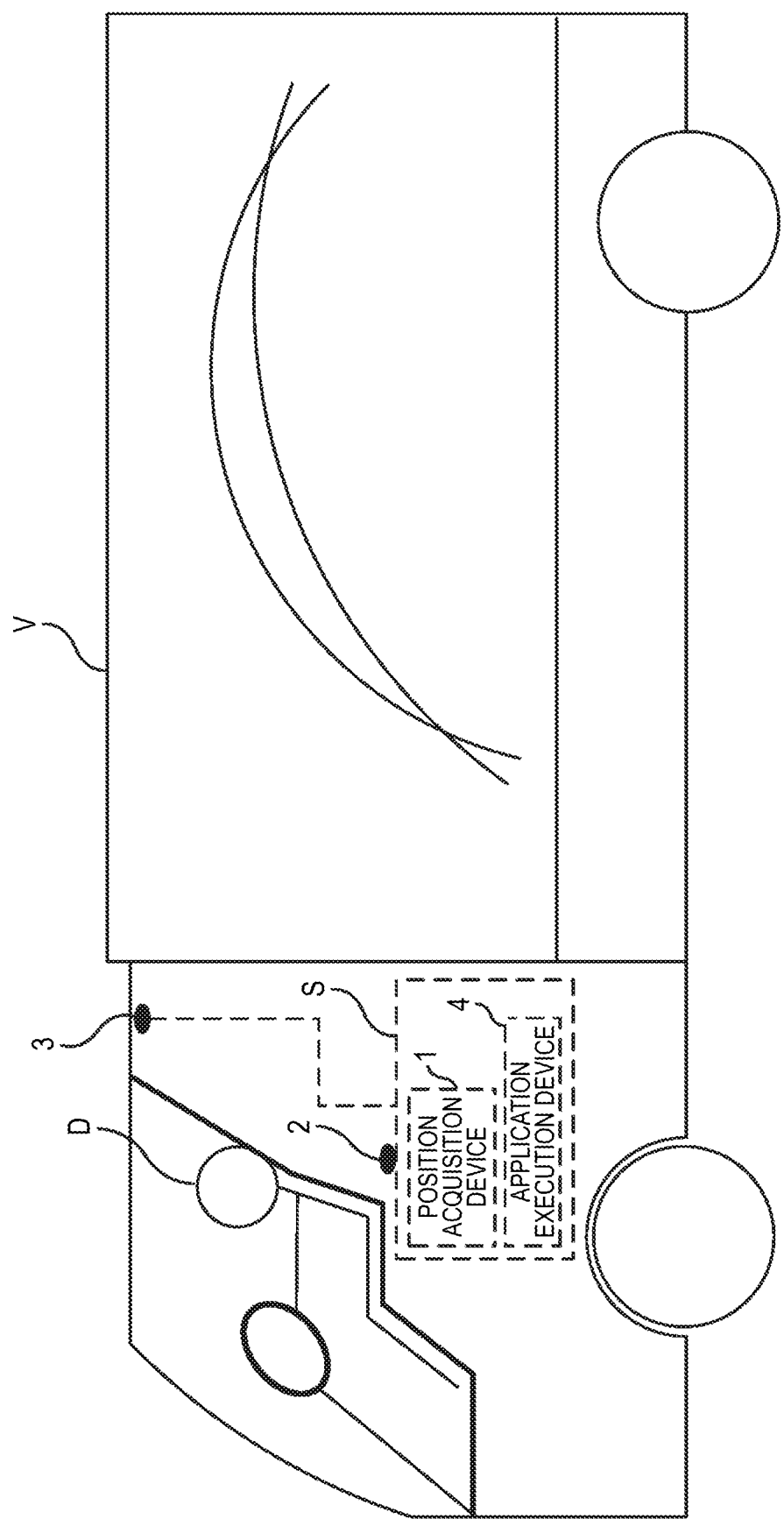
FIG. 1 is a schematic diagram for explaining an overview of a vehicle information processing system according to an embodiment.

FIG. 1 is a schematic diagram for explaining an overview of a vehicle information processing system S according to an embodiment. In an example shown in FIG. 1, the vehicle information processing system S is mounted on a vehicle V driven by a driver D. The vehicle information processing system S includes a position acquisition device 1, an angle sensor 2, a GPS receiving unit 3, and an application execution device 4. Hereinafter, a case where an on-board sensor is the "angle sensor 2" is described as an example, but the on-board sensor is not limited to the angle sensor 2, and may be another sensor such as an acceleration sensor as long as it is a sensor (that is, a sensor used for an autonomous navigation) for acquiring a position of the vehicle.

The angle sensor 2 is realized by, for example, a known gyro sensor or the like, and outputs inclination of the vehicle V. Although not shown in FIG. 1, the vehicle V also includes an acceleration sensor. By integrating output values of the angle sensor 2 and the acceleration sensor, the vehicle information processing system S can realize a so-called autonomous navigation in which a trajectory of a movement of the vehicle V from a starting point position is acquired.

The GPS receiving unit 3 receives a radio wave transmitted by each of a plurality of navigation satellites. The vehicle information processing system S can also realize a so-called satellite navigation in which the current position of the vehicle V on which the vehicle information processing system S is mounted is acquired by analyzing the radio wave received by the GPS receiving unit 3.

Here, for example, in a place where the radio wave cannot be received from the navigation satellite such as when the vehicle is travelling inside of a tunnel, the vehicle information processing system S cannot execute the satellite navigation. On the other hand, since the autonomous navigation uses the output value of each sensor mounted on the vehicle V, the vehicle information processing system S basically has an advantage that the autonomous navigation can be executed at any time.

However, the output values of the angle sensor 2 and the acceleration sensor may vary depending on how they are attached or individual differences. Therefore, the vehicle information processing system S includes the position acquisition device 1 that learns a change value for correcting the output values of the angle sensor 2 or an acceleration sensor and changes position data by using the position acquired by the satellite navigation or the like as teacher data, for example, and the application execution device 4 that executes an application based on the position information output by the position acquisition device 1. Incidentally, a learning process executed by the position acquisition device 1 can be realized by using a known method such as optimization using a least square method or machine learning such as a neutral network.

The position acquisition device 1 includes a calculation resource such as a central processing unit (CPU) or a memory, and executes the learning process and a change process of the change value of the output value of the sensor using the calculation resource. Specifically, the position acquisition device 1 stores the output value of the sensor and a learning result for correcting the output value in a temporary storage unit that can be read and written at a high speed, and changes the output value. However, the temporary storage unit is a volatile memory, and the stored content may be lost due to an instantaneous interruption of a power source of the vehicle V or generation of a negative surge. In addition, in an initial stage of unlearning or relearning, a reliability of the learning result is low, and the relearning is required.

Even when the learning result for changing the output value of the sensor is lost, the position acquisition device 1 can output the changed position information as long as the relearning can be performed immediately. For example, regardless of the type of road on which the vehicle V is traveling, the vehicle V is considered to frequently accelerate and decelerate. Therefore, the relearning is often relatively easy for the learning regarding the output value of the acceleration sensor.

The application execution device 4 executes various applications that use the position information output by the position acquisition device 1 (that is, position information by the autonomous navigation). Depending on the type of application, an accuracy required for the position information output by the autonomous navigation is also different.

For example, the accuracy of the position information recorded in a log application that records a state of the vehicle V is lower than an accuracy of the position information required for a travel control (for example, auto-cruise control or lane departure suppression control of the vehicle V) of the vehicle V. That is, depending on the application that uses the position information of the vehicle V, the position information obtained by the autonomous navigation output by the position acquisition device 1 may be used even if a change accuracy of the output value of the on-board sensor is low.

Therefore, in a case where the learning of the change value for changing the output value of the on-board sensor in the position acquisition device 1 is not completed, the application execution device 4 changes whether to adopt the output value of the position acquisition device 1 in accordance with a degree of achievement of the learning in the position acquisition device 1.

Specifically, the application execution device 4 first determines a traveling status indicating whether the vehicle V is traveling on a motor way. The application execution device 4 determines whether the output of the position acquisition device 1 is able to be used for executing the application based on the traveling status, a progress status acquired from the position acquisition device 1, and the traveling position.

Accordingly, for example, even when a change accuracy of the output value of the angle sensor 2 is low (that is, the state in which the learning by the position acquisition device 1 is not completed), the application execution device 4 uses the output value as long as the output value of the position acquisition device 1 is able to be used. That is, the position acquisition device 1 changes the output value of the angle sensor 2 regardless of the progress of the learning, and outputs the change together with the progress. In the vehicle information processing system S according to the embodiment, the application execution device 4 determines whether the output value of the angle sensor 2 output by the position acquisition device 1 is adopted.

Accordingly, in the vehicle information processing system S according to the embodiment, the output value during the learning can be effectively used in the application that uses the sensor whose a change amount of the output value is learned and changed.

Hereinafter, the vehicle information processing system S according to the embodiment will be described in more detail.

<Functional Configuration of Vehicle Information Processing System S>

Figure 2:
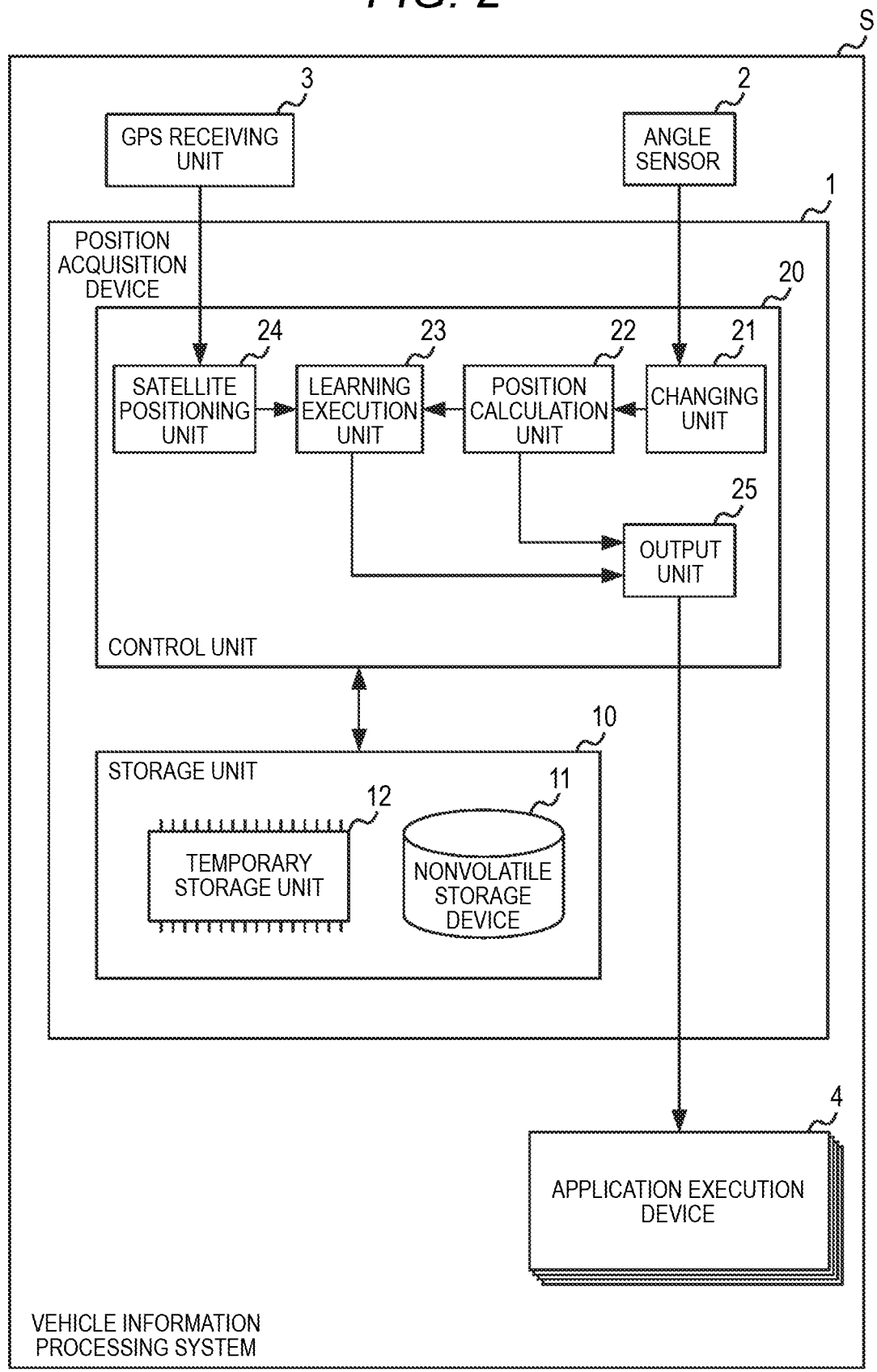
FIG. 2 is a diagram schematically showing a functional configuration of the vehicle information processing system according to the embodiment.

FIG. 2 is a diagram schematically showing a functional configuration of the vehicle information processing system S according to the embodiment. The vehicle information processing system S includes the position acquisition device 1, the angle sensor 2, the GPS receiving unit 3, and the application execution device 4. The position acquisition device 1 includes a storage unit 10 and a control unit 20.

The storage unit 10 includes a nonvolatile storage device 11 such as a hard disc drive (HDD) or a solid state drive (SSD), and a temporary storage unit 12 such as a dynamic random access memory (DRAM). The nonvolatile storage device 11 functions as a storage unit for various types of data such as various programs for realizing the vehicle information processing system S according to the embodiment and the learning result of the change value for changing the output value of the sensor. The temporary storage unit 12 functions as a work memory of the control unit 20. The nonvolatile storage device 11 is a nonvolatile memory, and the temporary storage unit 12 is a volatile memory.

The control unit 20 is a processor such as an electronic control unit (ECU) of the vehicle V or the like. The control unit 20 functions as a changing unit 21, a position calculation unit 22, a learning execution unit 23, a satellite positioning unit 24, and an output unit 25 by executing a program stored in the nonvolatile storage device 11.

The changing unit 21 reads the learning result of the change value for changing the output value of the on-board sensor such as the angle sensor 2 from the nonvolatile storage device 11 and stores the learning result in the temporary storage unit 12. The changing unit 21 changes the output value of the on-board sensor such as the angle sensor 2 with reference to the learning result stored in the temporary storage unit 12. The position calculation unit 22 calculates the traveling position of the vehicle V based on the output value of the on-board sensor such as the angle sensor changed by the changing unit 21.

The learning execution unit 23 learns the change value for changing the output value of the on-board sensor. In order to realize the learning by the learning execution unit 23, the satellite positioning unit 24 acquires the position coordinate of the vehicle V based on the radio wave received from the navigation satellite by the GPS receiving unit 3. The learning execution unit 23 learns the change value for changing the output value of the angle sensor 2 such that the position coordinate calculated from the output value of the angle sensor 2 becomes the position coordinate acquired by the satellite positioning unit 24.

In a case where a road on which the vehicle V is traveling is not the motor way, there are many opportunities for the vehicle V to make a curve or turn left and right, and a variation in the output value of the angle sensor 2 is also abundant. Therefore, even if the learning result is lost from the temporary storage unit 12 for some reason, the learning execution unit 23 can finish the relearning in a short time compared with the case where the vehicle V is traveling on the motor way. Therefore, in the case where the road on which the vehicle V is traveling is not the motor way, the learning execution unit 23 can restore an accuracy of the autonomous navigation in a short time by relearning the change value.

On the other hand, in a case where the road on which the vehicle V is traveling is the motor way, the learning by the learning execution unit 23 may progress more slowly than the learning in the case where the road is not the motor way, but the learning proceeds with time. In the case where the road on which the vehicle V is traveling is the motor way, even if the learning by the learning execution unit 23 is not completed, the application can use the change value during the learning as long as it is an application that logs the position of the vehicle V, for example. This is because the log has a certain usage value even if the accuracy of the position information is somewhat lacking.

The output unit 25 outputs the progress status of the learning by the learning execution unit 23 and the traveling position of the vehicle, that is the changed output value of the on-board sensor calculated by the position calculation unit 22, to the application execution device 4. The application execution device 4 determines whether the output of the position acquisition device 1 is able to be used for the execution of the application based on the progress state and the traveling position of the vehicle V acquired from the output unit 25 of the position acquisition device 1. The use/non-use determination of the output value of the position acquisition device 1 by the application execution device 4 will be described below.

As described above, there are various types of applications executed in the vehicle V, but these applications are broadly divided into applications for controlling the traveling of the vehicle V and applications that are not directly related to the travel control of the vehicle V.

Examples of the applications for controlling the traveling of the vehicle V include an application for suppressing the lane departure of the vehicle V, an application that controls a gear of the vehicle V by pre-reading a road gradient or the like of the road being traveled, an application for cruise traveling following a preceding vehicle, an application that controls the auto-cruise of the vehicle V integrated with these applications, or the like. Among these applications, the application related to the gear control and the auto-cruise is mainly executed while the vehicle V is traveling on the motor way such as a highway.

On the other hand, examples of the applications that are not directly related to the travel control of the vehicle V include the log application for recording the state of the vehicle V, an application for recording a traveling trajectory of the vehicle V, or the like. In general, these applications are performed regardless of whether the vehicle V is traveling on the motor way. As described above, the traveling status including whether the vehicle V is traveling on the motor way may be information that is referred to when the application execution device 4 determines whether to use the output value of the position acquisition device 1.

Therefore, the application execution device 4 acquires the traveling position of the vehicle V from the output unit 25. The application execution device 4 can determine the type of the road on which the vehicle V is traveling by collating the current position of the vehicle V with map data. In addition, in a case where information of an electronic toll collection (ETC) or the like is able to be used, the application execution device 4 may determine whether the vehicle V is traveling on the highway by determining whether the vehicle V passes through an entrance of the highway and passes through an exit of the highway. Accordingly, the application execution device 4 can determine whether the vehicle V is traveling on the motor way.

In a case where the application for controlling the traveling of the vehicle V is executed, the application execution device 4 determines whether the vehicle V is traveling on the motor way. In the case where the vehicle V is not traveling on the motor way, the application execution device 4 waits for executing the application that uses the output of the position acquisition device 1 until a progress rate of the learning included in the progress status acquired from the position acquisition device 1 reaches a predetermined ratio.

In the case where the vehicle V is not traveling on the motor way, the vehicle V frequently travels along a curve, or accelerates and decelerates, which is suitable for learning of the on-board sensor. Therefore, even when the application execution device 4 waits for executing the application, the learning of the position acquisition device 1 is completed in a shorter period of time compared with the case where the vehicle V is traveling on the motor way.

Here, the "predetermined ratio" is a "use/non-use determination threshold ratio" that is referred to by the application execution device 4 to determine whether the output value of the position acquisition device 1 is able to be used to execute the application. The use/non-use determination threshold ratio is stored in the nonvolatile storage device 11. A specific value of the use/non-use determination threshold ratio may be determined by an experiment in consideration of a position accuracy required for the application executed by the application execution device 4 and an accuracy, the type or the like of the on-board sensor that is an object to be learned of the position acquisition device 1.

A use/non-use determination threshold ratio used for use determination of the application for controlling the traveling of the vehicle V is set to be higher than a use/non-use determination threshold ratio used for use determination of the application that is not directly related to the travel control of the vehicle V.

For example, in the case where the application for controlling the traveling of the vehicle V is executed, the application execution device 4 waits for executing of the application that uses the output of the position acquisition device 1 until the progress rate of the learning included in the progress status acquired from the position acquisition device 1 reaches the use/non-use determination threshold ratio.

In contrast, in a case where the application (for example, an application for recording a traveling trajectory) that is not directly related to the travel control of the vehicle V is executed, the application execution device 4 may execute the application that uses the output of the position acquisition device 1 regardless of the progress rate of the learning included in the progress status acquired from the position acquisition device 1. This is equivalent to the fact that the use/non-use determination ratio for the application that is not directly related to the travel control of the vehicle V is 0%.

The application execution device 4 executes the application that is not directly related to the travel control of the vehicle V even when the vehicle V is traveling on a road other than the motor way.

In this way, the application execution device 4 determines whether to execute the application that uses the output value of the position acquisition device 1 based on a road condition of the road on which the vehicle V is traveling, the progress status of the learning by the position acquisition device 1, and the type of application to be executed. Accordingly, even when the learning of the on-board sensor by the position acquisition device 1 is not completed, the application execution device 4 executes the application that uses the output of the position acquisition device 1 as much as possible. Therefore, the application execution device 4 can effectively use the output value during the learning of the position acquisition device 1.

<Processing Flow of Information Processing Executed by Vehicle Information Processing System S>

Figure 3:
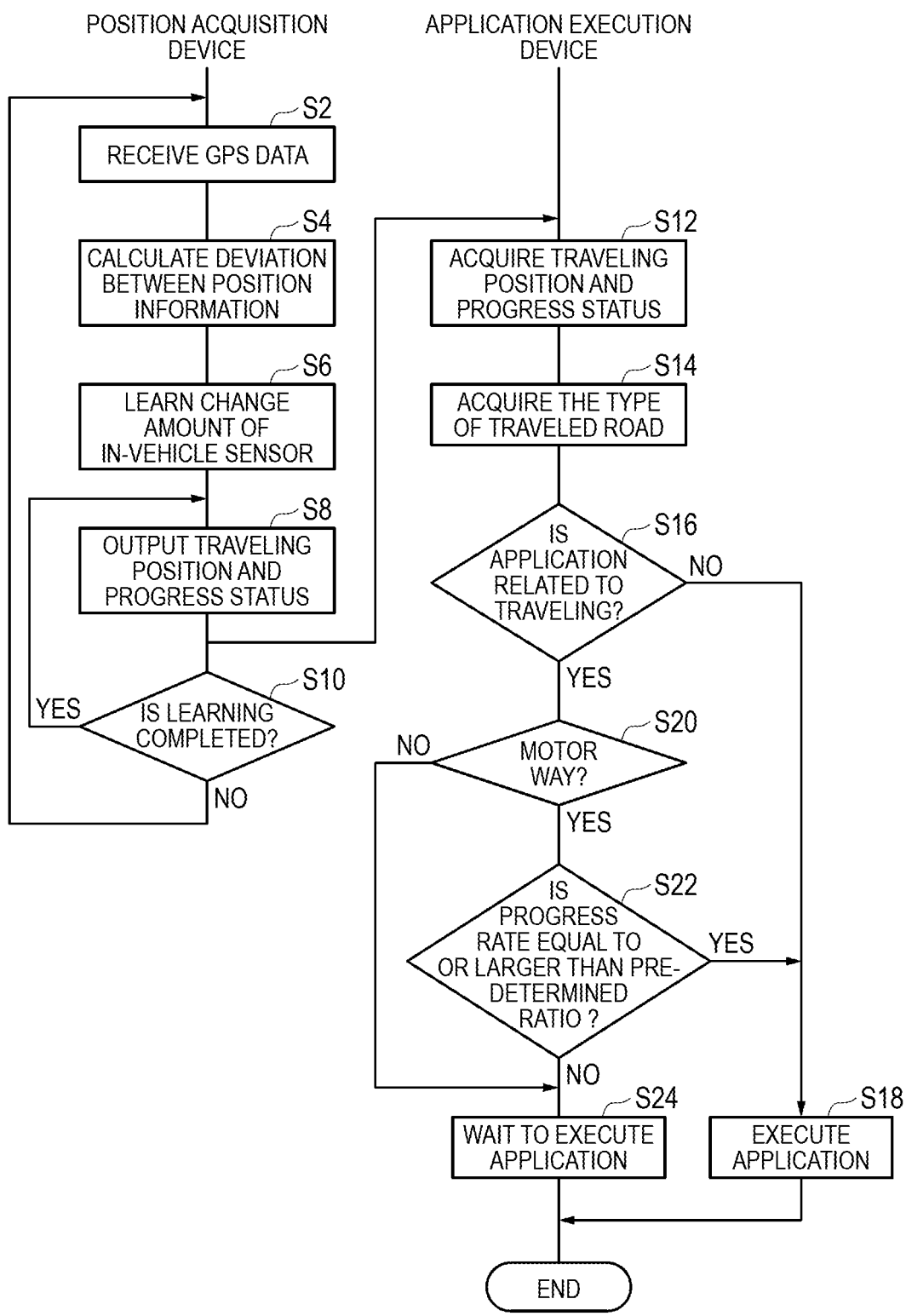
FIG. 3 is a sequence diagram for explaining a flow of processing executed by the vehicle information processing system according to the embodiment.

FIG. 3 is a sequence diagram for explaining a flow of processing executed by the vehicle information processing system S according to the embodiment. The processing in the sequence diagram starts when an engine of the vehicle V is started, for example.

The GPS receiving unit 3 of the position acquisition device 1 receives GPS data from the navigation satellite (S2). The learning execution unit 23 calculates a deviation between the position information calculated from the GPS data and the position information calculated from the output value of the on-board sensor changed by the changing unit 21 (S4). The learning execution unit 23 learns the change amount of the output of the on-board sensor including the angle sensor 2 (S6). The output unit 25 outputs the progress status of the learning by the learning execution unit 23 and the traveling position of the vehicle V calculated based on the output value of the on-board sensor changed by the changing unit 21 to the application execution device 4 (S8).

The position acquisition device 1 continues the processing from step S2 to step S8 until the learning of the change amount of the output value of the sensor is completed (No in S10). When the learning of the change amount of the output value of the sensor is completed (Yes in S10), the position acquisition device 1 continues the processing of step S8.

The application execution device 4 acquires the progress status of the learning by the learning execution unit 23 and the traveling position of the vehicle V from the output unit 25 of the position acquisition device 1 (S12). The application execution device 4 acquires the type of the road on which the vehicle V is traveling by referring to the map data based on the acquired traveling position (S14).

In a case where the application executed by the application execution device 4 is not the application related to the traveling of the vehicle V (No in S16), the application execution device 4 executes the application that uses the traveling position acquired from the position acquisition device 1 (S18).

In a case where the application executed by the application execution device 4 is an application related to the traveling of the vehicle V (Yes in S16), and in the case where the vehicle V is not traveling on the motor way (No in S20), the application execution device 4 waits for executing the application that uses the traveling position acquired from the position acquisition device 1 until the progress rate of the learning reaches the predetermined ratio (S24).

In the case where the application executed by the application execution device 4 is the application related to the traveling of the vehicle V (Yes in S16), and in the case where the vehicle V is traveling on the motor way (Yes in S20), and the progress rate of the learning is equal to or larger than the predetermined ratio (Yes in S22), the application execution device 4 executes the application that uses the traveling position acquired from the position acquisition device 1 (S18).

In the case where the application executed by the application execution device 4 is the application related to the traveling of the vehicle V (Yes in S16), and in the case where the vehicle V is traveling on the motor way (Yes in S20), and the progress rate of the learning is less than the predetermined ratio (No in S22), the application execution device 4 waits for executing the application that uses the traveling position acquired from the position acquisition device 1 until the progress rate of the learning reaches the predetermined rate (S24).

By repeating the above processing, the application execution device 4 is used to execute the application as long as the traveling position acquired from the position acquisition device 1 is available, even if the learning by the position acquisition device 1 is not completed.

<Effect of Vehicle Information Processing System S According to Embodiment>

As described above, according to the vehicle information processing system S according to the embodiment, the output value during the learning can be effectively used in the application that uses the on-board sensor whose the change amount of the output value is learned and changed.

Particularly, in the case where the application execution device 4 executes the application for controlling the traveling of the vehicle V, and in the case where the vehicle V is not traveling on the motor way, the application execution device 4 waits for executing the application that uses the output of the position acquisition device 1, until the progress rate of the learning included in the progress status acquired from the position acquisition device 1 reaches the predetermined ratio.

The learning can be expected to be completed in a short time while the vehicle V is traveling in an urban area or the like that is not the motor way. Therefore, the application execution device 4 can execute the application that uses more accurate information by waiting for the execution of the application. In addition, since the application execution device 4 uses the output of the position acquisition device 1 even before the learning is completed if the progress rate of the learning reaches the predetermined ratio, the output value during the learning can be effectively used.

In the case where the application execution device 4 executes the application for controlling the traveling of the vehicle V and in the case where the vehicle V is traveling on the motor way, the application execution device 4 waits for executing the application that uses the output of the position acquisition device 1, until the progress rate of the learning included in the progress status acquired from the position acquisition device 1 reaches the predetermined ratio. Accordingly, a safety of the control of the vehicle V can be further improved in the application for controlling the traveling.

In the case where the application execution device 4 executes the application that is not directly related to the travel control of the vehicle, the application is executed using the output of the position acquisition device 1 regardless of the traveling status of the vehicle V or learning status of the position acquisition device 1. Accordingly, the output value during the learning can be effectively used.

This disclosure has been described using the embodiment, but the technical scope of this disclosure is not limited to the scope described in the above-described embodiment. It is apparent to those skilled in the art that various modifications and improvements can be added to the above-described embodiment. It is also apparent from description of the scope of claims that an embodiment with such modifications or improvements can be included in the technical scope of this disclosure.

The present application is based on a Japanese Patent Application (Japanese Patent Application No. 2017-098583) filed on May 18, 2017, the contents of which are incorporated herein by reference.

INDUSTRIAL APPLICABILITY

According to this disclosure, it is possible to provide a technique for effectively using the output value during the learning in the application that uses the on-board sensor whose a change amount of the output value is learned and changed.

REFERENCE SIGNS LIST

1 position acquisition device
2 angle sensor
3 GPS receiving unit
4 application execution device
10 storage unit
11 nonvolatile storage device
12 temporary storage unit
20 control unit
21 changing unit
22 position calculation unit
23 learning execution unit
24 satellite positioning unit
25 output unit
S vehicle information processing system
V vehicle

The invention claimed is:

1. A vehicle information processing system comprising:
an on-board sensor mounted on a vehicle;
a position acquisitor that learns a change value of the on-board sensor for acquiring a traveling position of the vehicle, and
an application executor that executes an application related to traveling of the vehicle by using an output of the position acquisitor,
wherein the position acquisitor includes: a controller; and a memory,
wherein the controller performs:
   learning a change value of an output value of the on-board sensor,
   changing the output value of the on-board sensor based on the change value,
   calculating the traveling position of the vehicle based on the output value of the on-board sensor changed by the changing, and
   outputting a progress status of the learning by the learning and the traveling position of the vehicle calculated by the calculating, and
wherein the application executor determines whether to execute the application by using the output of the position acquisitor or wait for executing the application by using the output of the position acquisitor, based on the progress status and the traveling position acquired from the position acquisitor, and
wherein the application executor is configured to execute an application for controlling the traveling of the vehicle and waits for executing the application that uses the output of the position acquisitor until a progress rate of the learning included in the progress status acquired from the position acquisitor reaches a predetermined ratio, in a case where the vehicle is not traveling on a motor way.

2. The vehicle information processing system according to claim 1, wherein the application executor is configured to execute an application that is not to a travel control application of the vehicle and executes the application that uses the output of the position acquisitor regardless of a progress rate of the learning included in the progress status acquired from the position acquisitor.

3. A vehicle information processing system comprising:
an on-board sensor mounted on a vehicle;
a position acquisitor that learns a change value of the on-board sensor for acquiring a traveling position of the vehicle, and
an application executor that executes an application related to traveling of the vehicle by using an output of the position acquisitor,
wherein the position acquisitor includes:
a controller; and
a memory,
wherein the controller performs:
learning a change value of an output value of the on-board sensor;
changing the output value of the on-board sensor based on the change value;
calculating the traveling position of the vehicle based on the output value of the on-board sensor changed by the changing; and
outputting a progress status of the learning by the learning and the traveling position of the vehicle calculated by the calculating,
wherein the application executor determines whether to execute the application by using the output of the position acquisitor or wait for executing the application by using the output of the position acquisitor, based on the progress status and the traveling position acquired from the position acquisitor, and
wherein the application executor is configured to execute an application for controlling the traveling of the vehicle and waits for executing the application that uses the output of the position acquisitor until a progress rate of the learning included in the progress status acquired from the position acquisitor reaches a predetermined ratio.

* * * * *